July 22, 1924.
H. HAUSRATH
1,502,562
THERMOPILE AND METHOD OF ITS MANUFACTURE
Filed Aug. 15, 1922   2 Sheets-Sheet 1
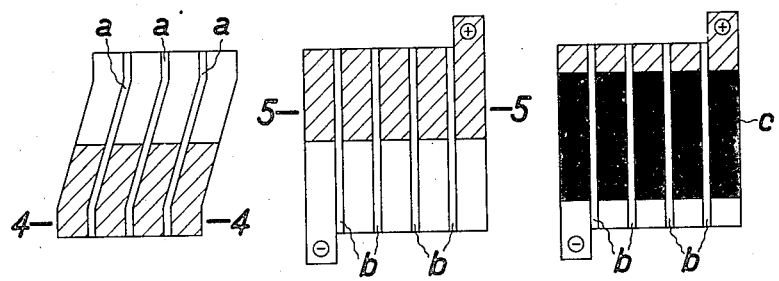
Fig. 1   Fig. 2   Fig. 3
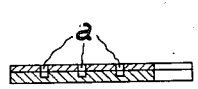   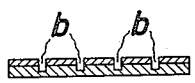
Fig. 4   Fig. 5
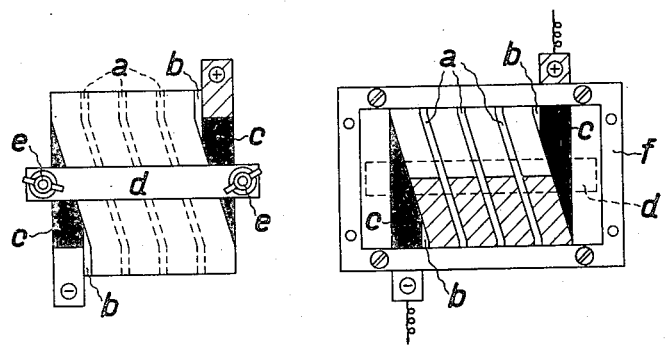
Fig. 6   Fig. 7
Fig. 8
Inventor:
Herbert Hausrath July 22, 1924.

H. HAUSRATH

THERMOPILE AND METHOD OF ITS MANUFACTURE

Filed Aug. 15, 1922  2 Sheets-Sheet 2

Inventor:

Herbert Hausrath

Patented July 22, 1924.

1,502,562

UNITED STATES PATENT OFFICE.

HERBERT HAUSRATH, OF DURLACH, NEAR KARLSRUHE, GERMANY, ASSIGNOR TO THE FIRM OF SCHOTT & GEN., OF JENA, GERMANY.

THERMOPILE AND METHOD OF ITS MANUFACTURE.

Application filed August 15, 1922. Serial No. 582,030.

*To all whom it may concern:*

Be it known that I, HERBERT HAUSRATH, a citizen of the German Republic, and residing at Durlach, near Karlsruhe, Germany, have invented a new and useful Thermopile and Method of Its Manufacture (for which I have filed an application in Germany, February 26, 1917), of which the following is a specification.

The object of the present invention is to create a new form of thermo-piles which also admits of making as easily as possible larger piles, even if very thin foils be used in making the same.

A further subject of the invention is the method of making such piles which method consists in this, that in at least two foils consisting of two parts of different metal, connected along a line, a larger number of strips are separated side by side and substantially parallel to each other in such a way that the connexion of the separate strips of one foil is not entirely lost and that these foils, if necessary, by inserting insulating layers, are then superposed and fixed in such a manner that of two strips, consisting of two different metals, only two ends each are joined to each other so as to form an electric connection. The complete separation of the single strips of one foil only takes place after that.

With a view to obtaining thermo-couples as thin as possible and to being able to easily handle the foils, it is suitable to use foils which are first laid on a plate of metal protecting the foil during its treatment. The subdivision of the foils into single strips can be effected by stamping out corresponding intervals between the single strips, by engraving, etching or the like.

The annexed drawing shows three constructional examples of the new method.

Fig. 1 is a view of a foil of the first pile.

Figs. 2 and 3 are views of a second foil of the same pile at different stages of the process.

Fig. 4 is a section on the line 4—4 of Fig. 1.

Fig. 5 is a section on the line 5—5 of Fig. 2.

Fig. 6 is a view of two superposed foils corresponding to Figs. 1 and 2.

Fig. 7 is an elevation of the finished pile forming the first example and

Fig. 8 is a side elevation of the same.

Figure 9:
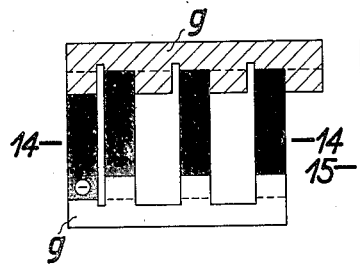
Figs. 9 to 13 are a view each of the foils of the second pile.
Figure 10:
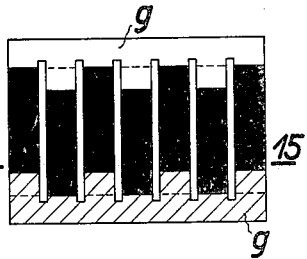
Figure 11:
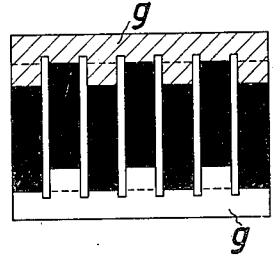
Figure 12:
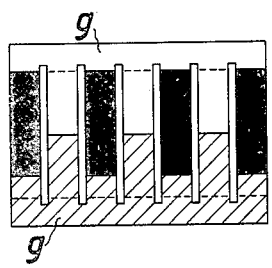
Figure 13:
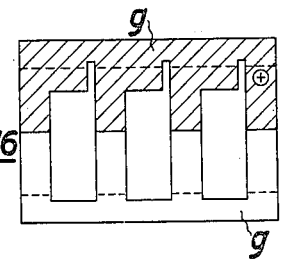
Figure 14:
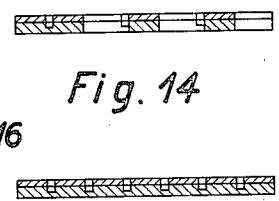
Figs. 14 to 16 are sections on the corresponding lines of Figs. 9, 10 and 13.
Figure 15:
Figure 16:
Figure 17:
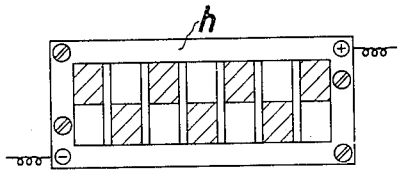
Fig. 17 is a view of the finished pile forming the second example.
Figure 18:
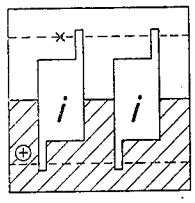
Figs. 18 and 19 are a view each of the two foils of the pile forming the third example and being specially destined for measurements of radiations.
Figure 19:
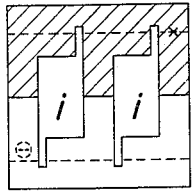

The foils shown in Figs. 1 to 3, 9 to 13 and 18 to 19 inclusive consist of two different metals each, which are both welded together along a straight line and of which the electronegative one is denoted by hatching. In all these foils the foil metal is connected with a protecting metal which is assumed to be found below the foil.

In addition, the following may be remarked relating to these figures. In order to make a pile as selected in the first example, a foil is at first subdivided, which is still connected to the protecting metal, in such a way as shown in Figs. 1 to 4, by producing, e. g. by means of engraving, grooves $a$ running parallelly to each other which completely cut the foil but still allow the protecting metal to remain as a coherent plate. Hereupon a foil, as shown in Figs. 2, 3 and 5, is in the same way subdivided by grooves $b$ and the foil is provided in the part shown in black in Fig. 3 with an insulating coat $c$ by lacquering this part in a suitable way or by pasting an insulating paper on it. Hereafter the foil shown in Fig. 1 is placed upon the one shown in Fig. 3 in the manner illustrated in Fig. 6, whereby the protecting metal of both foils will be outside. In this position both foils are pressed together by means of a clamp consisting of two bars $d$ and two wing screws $e$ and then the protecting metal is removed, e. g. by dipping the packet into a suitable solvent to such an extent as the bars $d$ admit. Hereupon one fixes the two foils within a frame $f$ of insulating material, representing the definite holding frame of the pile, removes the bars $d$ and the screws $e$ and removes the remainder of the protecting metal, whereby the mounting of this pile, which consists of nine elements disposed in succession, is terminated.

By heating in this pile the superposed welded junctures of the two foils, e. g. by means of a heating band guided along these welded junctures, and by closing the outer circuit of the pile, there flows within the pile a current from the point marked — through the left strip of the lower foil to the left strip of the upper foil, then proceeds to the second strip from the left of the lower foil and from the latter to the second strip from the left of the upper foil and so on as far as the point marked + of the pile.

In order to obtain a pile, as chosen as the second example, one proceeds in the following way. One subdivides five foils according to Figs. 9 to 13 by providing the foils, e. g. by means of etching with excavations and insulates them by means of lacquering at the points drawn in black. With a view to preventing in this case the provisional pressing together of the foils with a clamp to be removed again later on and the removal of the protecting metal in two working stages, beyond the definite length of the strips forming the single thermo-couples, transversely to the same, nonsubdivided margins $g$ have been left. It is thus possible to remove the protecting metal prior to superposing the single foils and without losing in that case the connexion of the single strips of elements of a foil. The protecting metal having then been removed, the five foils are superposed in such a way that their lelt-hand upper corners will be superposed, that the foil shown in Fig. 9 lies nethermost and that the foils succeed each other in the same order as shown in the drawing. Hereupon one fixes the foil packet in a frame $h$ of insulating material, the definite holding frame of the pile, in such a manner that the margins $g$, i. e. the parts of the foil lying beyond the dotted lines will be beyond the frame $h$ and then cuts off the projecting margins $g$. In this manner one obtains a thermo-pile consisting of twenty-nine elements disposed in succession.

If the welded junctures of this pile be heated, a current flows, on the outer circuit being closed, within the pile from the end marked — of the left-hand strip of the first nethermost foil through this strip, proceeds into the left strip of the second foil, flows through the same and so forth through the left strips of all foils in succession. After having flown through the respective strip of the fifth section, it goes over through the lateral flap of this strip to the second strip from the left of the fourth foil, thence to the second strip from the left of the third, second and first foil and from the latter it goes over to the third strip from the left of the second foil. In this way the current flows through all strips until it reaches the point marked + of the fifth foil where it leaves the pile.

Figure 20:
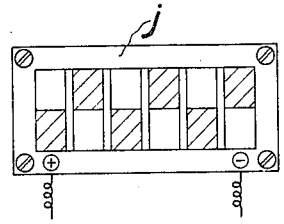
Fig. 20 is a view of the finished third pile.

In order to make the third pile, destined for radiating purposes, (vide Figs. 18 to 20) in two foils connected to the protecting metal intervals $i$ have been stamped out. The protecting metal having been removed, these two foils are superposed in such a way that the two marked points of the upper dotted lines will be superposed. In this position the foils are so fixed in a frame $j$, the definite holding frame of the thermo-pile and again consisting of insulating material, that the parts of the foils, lying beyond the dotted lines, will be outside the frame. By then again cutting off these protecting parts, one obtains a pile of six elements disposed in succession and located in such a way that all their welded junctures are accessible to a radiation emanating from one side of the pile.

I claim:

1. Method of making thermo-piles, consisting in connecting two foils of different metal along a line, dividing out of this pair of foils a number of strips side by side and substantially parallel to each other in such a direction that each strip crosses the said line and in such a way that the connexion of the single strips is not entirely lost, superposing a plurality of such pairs of foils, and fixing them upon each other in such a way that of two strips, consisting of different metals, only two ends each are in electric contact with each other, and then completely separating the single strips of a pair of foils from each other.

2. Method of making thermo-piles, consisting in connecting two foils of different metal along a line, dividing out of this pair of foils a number of strips side by side and substantially parallel to each other in such a direction that each strip crosses the said line and in such a way that the connexion of the single strips is not entirely lost, that furthermore a strip and an interval of approximately the same breadth succeed each other, at the ends of the said strips flaps projecting into the range of an interval being provided for superposing two such pairs of foils and fixing them upon each other in such a way that the strips of the one will lie in the intervals of the other and the ends of two strips of different metals are always in electric contact with each other, and then completely separating the single strips of a pair of foils from each other.

3. Method of making thermo-piles, consisting in connecting two foils of different metal along a line, dividing out of this pair of foils a number of strips side by side and substantially parallel to each other in such a direction that each strip crosses the said line and connected with each other on both ends by a coherent margin, superposing a plurality of such pairs of foils, and fixing them upon each other in such a way that of two strips, consisting of different metals, only two ends each are in electric contact with each other, and then removing the said coherent margins.

4. Thermo-pile which comprises in each of a plurality of superposed planes a number of strips of which strips each is composed of two parts of different metal joined together at one of their ends, in each plane the strips lying substantially parallel to each other and the neighbouring strips facing each other with parts consisting of the same metal, each plane of strips facing the neighbouring one with parts consisting of different metal, and each end of a strip of one plane being in electric contact with that end of a strip of another plane, which faces it.

5. Thermo-pile which comprises in two superposed planes a number of strips of which strips each is composed of two parts of different metal joined together at one of its ends, in each plane the strips lying substantially parallel to each other and the neighbouring strips facing each other with parts consisting of the same metal, in each plane a strip and an interval of approximately the same breadth succeeding each other and the strips comprising at least at one of their ends a flap projecting into the neighbouring interval, the planes of strips facing each other with parts consisting of different metal, the planes lying relatively to each other in such a way that the strips of the one will lie in the intervals of the other and each strip of one plane being at its end in electric contact with the neighbouring strips of the other plane.

HERBERT HAUSRATH.

Witnesses:
PAUL KRÜGER,
RICHARD HAHN.